United States Patent
MacIntyre

(10) Patent No.: US 12,123,521 B2
(45) Date of Patent: Oct. 22, 2024

(54) SUBSEA INSTALLATIONS COMPRISING CORROSION-RESISTANT FLOWLINES

(71) Applicant: Subsea 7 Limited, Sutton (GB)

(72) Inventor: Liam Thomas Bradwell MacIntyre, Aberdeen (GB)

(73) Assignee: Subsea 7 Limited, Sutton (GB)

( * ) Notice: Subject to any disclaimer, the term of this patent is extended or adjusted under 35 U.S.C. 154(b) by 355 days.

(21) Appl. No.: 17/602,717

(22) PCT Filed: Apr. 8, 2020

(86) PCT No.: PCT/GB2020/050917
§ 371 (c)(1),
(2) Date: Oct. 8, 2021

(87) PCT Pub. No.: WO2020/208353
PCT Pub. Date: Oct. 15, 2020

(65) Prior Publication Data
US 2022/0170570 A1   Jun. 2, 2022

(30) Foreign Application Priority Data
Apr. 9, 2019   (GB) .................................... 1905017

(51) Int. Cl.
*F16L 1/235*   (2006.01)
*F16L 1/19*    (2006.01)

(52) U.S. Cl.
CPC ............... *F16L 1/235* (2013.01); *F16L 1/19* (2013.01)

(58) Field of Classification Search
CPC .................................. F16L 1/235; F16L 1/19
(Continued)

(56) References Cited

U.S. PATENT DOCUMENTS

| | | | |
|---|---|---|---|
| 3,658,366 A | * | 4/1972 | Welch, Jr. ........... E21B 43/0107 285/31 |
| 5,380,129 A | * | 1/1995 | Maloberti ................. F16L 1/16 405/168.1 |

(Continued)

FOREIGN PATENT DOCUMENTS

| GB | 2501523 | 10/2013 |
|---|---|---|
| GB | 2523835 | 9/2015 |

(Continued)

OTHER PUBLICATIONS

ANSI/API Specification 17J, "Specification for Unbonded Flexible Pipe," 3d ed. 2008.

(Continued)

*Primary Examiner* — David R Deal
(74) *Attorney, Agent, or Firm* — Mattingly & Malur, PC

(57) ABSTRACT

A method of installing a subsea tie-in conduit comprises unspooling or manufacturing a steel rigid lined pipeline aboard an installation vessel and launching the pipeline progressively into water. A distal end of the tie-in conduit is coupled to a proximal end of the pipeline above the surface and is then launched into the water coupled to the pipeline. The suspended weight load of the pipeline is supported by an A&R wire connected to the proximal end of the pipeline, defining a load path that bypasses the tie-in conduit. A proximal end of the tie-in conduit may be suspended from that wire. The tie-in conduit is of composite or flexible pipe, hence being pliant relative to the lined rigid pipeline and maintaining its internal corrosion resistance. After landing on the seabed, the tie-in conduit may be deflected relative to the pipeline for connection to a subsea connection point.

27 Claims, 7 Drawing Sheets

(58) Field of Classification Search
USPC .......................................................... 138/107
See application file for complete search history.

(56) References Cited

U.S. PATENT DOCUMENTS

| | | | |
|---|---|---|---|
| 8,007,203 B2* | 8/2011 | Espinasse | E21B 43/013 |
| | | | 405/172 |
| 9,121,529 B2* | 9/2015 | Machado | F16L 1/16 |
| 10,655,757 B2 | 5/2020 | Endal et al. | |
| 2003/0077125 A1* | 4/2003 | Ploeg | F16L 55/1652 |
| | | | 405/184.2 |
| 2009/0162146 A1* | 6/2009 | Bastard | F16L 1/19 |
| | | | 405/172 |
| 2010/0196101 A1* | 8/2010 | Pose | F16L 1/26 |
| | | | 405/170 |
| 2012/0107050 A1 | 5/2012 | Wolbers et al. | |
| 2018/0066770 A1* | 3/2018 | Hoyvik | F16L 1/16 |

FOREIGN PATENT DOCUMENTS

| | | |
|---|---|---|
| WO | WO 2007/006963 | 1/2007 |
| WO | WO 2017/146582 | 8/2017 |

OTHER PUBLICATIONS

API Specification 5L, "Specification for Line Pipe," 45th ed. 2012.
API Recommended Practice 17B, "Recommended Practice for Flexible Pipe," 5th ed. 2014.
API Recommended Practice 1111, "Design, Construction, Operation, and Maintenance of Offshore Hydrocarbon Pipelines (Limit State Design)," 5th ed. 2015.

* cited by examiner

SUBSEA INSTALLATIONS COMPRISING CORROSION-RESISTANT FLOWLINES

This invention relates to subsea oil and gas installations for producing hydrocarbon fluids from subsea wells. The invention relates particularly to subsea installations that incorporate corrosion-resistant flowlines to handle 'sour' fluids containing corrosive compounds.

Subsea flowlines convey hydrocarbon fluids on their journey from a subsea well to a surface facility that receives the fluids for onward transport, such as a platform or a floating production, storage and offloading (FPSO) vessel. Other fluids such as water or chemicals may be conveyed in parallel pipes in the opposite direction for injection into the well or for supplying subsea processing systems.

It is not practical for a flowline to extend continuously as a unitary conduit along its entire length from a subsea well to a surface facility. In practice, therefore, a flowline typically comprises multiple sections that are connected in series and in fluid communication with each other. For example, a subsea flowline typically comprises a main pipeline that extends across the seabed from a subsea wellhead or manifold, potentially for tens of kilometres, a riser extending from the seabed toward the surface, piping on subsea structures such as manifolds or tees, and tie-in connections known as spools or jumpers to connect those sections.

The shape, structure and composition of each section of a flowline is chosen to suit its specific function. For example, spools and jumpers have to effect the necessary connections while complying with positional changes that arise from installation tolerances and from relative movement of subsea equipment post-installation. Such positional changes may, for example, result from settlement of heavy structures into low-strength seabed soils and from thermal expansion and contraction of lengthy flowline sections, which can result in 'walking' across the seabed over time. Also, a moored surface installation will move within a footprint area under the influence of currents, weather and surface dynamics.

Thus, the overall distance between the wellhead and the surface facility, and consequently also between at least some sections of the flowline, is not strictly defined at installation and will vary over time. Spools and jumpers are designed to accommodate these changes by being pliant in various planes.

Before considering the prior art in more detail, it is helpful to understand what the terms 'rigid pipe' and 'flexible pipe' mean to those skilled in the art. Conventional rigid pipes used in the subsea oil and gas industry are specified in the American Petroleum Institute (API) Specification 5L and Recommended Practice 1111. A rigid pipe usually consists of, or comprises, at least one pipe of solid steel or steel alloy. However, additional elements can be added, such as an internal liner layer or an outer coating layer. Such additional elements can comprise polymer, metal or composite materials. Rigid pipe joints are terminated by a bevel, a thread or a flange, and are assembled end-to-end by welding, screwing or bolting them together to form a pipe string or pipeline.

The allowable in-service deflection of rigid steel pipe is determined by the elastic limit of steel, which is around 1% bending strain. It follows that the minimum bending radius or MBR of rigid pipe used in the subsea oil and gas industry is typically around 100 to 300 metres depending upon the cross-sectional dimensions of the pipe. Exceeding this limit caused plastic deformation of the steel, although some plastic deformation can be recovered by a subsequent straightening process.

Whilst they have enough flexibility to bend elastically along a substantial length, rigid pipes do not fall within the definition of flexible pipes as understood in the art. Flexible pipes used in the subsea oil and gas industry are specified in API Specification 17J and Recommended Practice 17B. The pipe body is composed of a composite structure of layered materials, in which each layer has its own function. In particular, bonded flexible pipes comprise bonded-together layers of steel, fabric and elastomer and are manufactured in short lengths in the order of tens of metres. Typically, polymer tubes and wraps ensure fluid-tightness and thermal insulation, whereas steel layers or elements provide mechanical strength. Conversely, unbonded flexible pipes can be manufactured in lengths of hundreds of metres but are very expensive and have limited strength.

The composite structure of a flexible pipe allows a large bending deflection without a similarly large increase in bending stresses. The bending limit of the structure is determined by the elastic limit of its outermost plastics layer, typically the outer sheath, which limit is typically 6% to 7% bending strain. Consequently, the MBR of flexible pipe used in the subsea oil and gas industry is typically between 3 and 6 metres. Exceeding that limit causes irreversible damage to the structure.

In recent years, the subsea oil and gas industry has begun to adopt composite pipes of polymer composite materials as an equivalent to, or replacement for, conventional rigid pipes of steel. Composite pipes have a tubular load-bearing structure that is principally of composite materials. This is to be distinguished from pipes having a composite structure, such as various layered configurations that may be used in both rigid and flexible pipes. Typically, the composite material used in a composite pipe comprises a polymer resin matrix reinforced by fibres such as glass fibres or carbon fibres. The polymer matrix may be of thermoplastic or thermoset materials. The former results in what is known in the art as thermoplastic composite pipe or, more simply, as thermocomposite pipe (TCP). TCP is classed as a bonded composite pipe.

The composite tube of a TCP has a solid, monolithic structure comprising a polymer liner, a polymer composite matrix and an optional outer coating that may also be of polymer. The polymer of the liner, the matrix and/or the coating may, for example, be polypropylene. The matrix is a true composite reinforced with fully-embedded reinforcing fibres.

Like-for-like, composite pipes are generally more pliant than conventional rigid pipes of steel and can be bent elastically to a smaller MBR. However, like conventional rigid pipes, composite pipes have a characteristic of rigidity that is largely absent from flexible pipes, namely a capability to deflect elastically along their length and a tendency to straighten under elastic recovery.

Most commonly, the lengthy main pipeline section of a flowline comprises a rigid pipe made primarily of steel. Steel achieves a good balance between structural strength and cost, and is less expensive than an equivalent length of TCP. However, steel has to be protected from corrosion. Consequently, where there is a risk of internal corrosion from sour fluids, steel pipelines are provided with corrosion-resistant liners which may, for example, be made of a polymer material. Polymer lining technology is offered by a sister company of the Applicant under the registered trade mark 'Swagelining'. This can be more cost-effective than lining rigid pipelines with corrosion-resistant alloy (CRA) liners, which have been used traditionally as an internal corrosion barrier.

Spools and jumpers can have various shapes, structures and compositions. For example, GB 2501523 discloses spools and jumpers made from rigid pipe. Whilst rigid, the pipe comprises bends that can accommodate slight angular deviations. However, spools and jumpers of rigid pipe must be designed with specific shapes and dimensions. Their final shape and dimensions can only be determined by a metrology process after the subsea structures to be connected by them have been installed on the seabed. These steps of measurement, design and manufacturing take valuable time and may require additional vessel campaigns, and so cost a lot of money.

In the context of corrosion-resistant flowlines, another drawback of rigid spools and jumpers is that it is difficult to manufacture lined bends, especially polymer-lined bends. So, even where the main pipeline is polymer-lined, rigid spools or jumpers at either end of the pipeline are typically still fabricated using CRA liners, which is expensive, or are made of solid CRA, which is even more expensive.

Metrology can be avoided by using a material for spools and jumpers that is substantially less stiff or more pliant than rigid pipe. This allows a spool or jumper to be bent underwater to an extent sufficient to cope with considerable positional variation between the subsea structures that are to be connected. For example, flexible pipe may be used as disclosed in WO 2007/006963 or pliant TCP may be used as disclosed in GB 2523835. Alternatively, an articulated rigid pipe is disclosed in U.S. Pat. No. 3,658,366.

Whatever their shape, structure or composition, at least one additional operation is required to complete the installation of a spool or jumper. This increases cost and business risk due to the high operational cost of an installation vessel, coupled with tie-up of valuable capital assets and reliance on the availability of a suitable weather window.

In principle, the main pipeline itself can be bent or deflected to enable direct tie-in to another subsea structure without an intermediate spool or jumper. This is the conventional way to connect an unbonded flexible pipeline, which is highly pliant and so can accommodate the necessary deflections without damage. However, unbonded flexible pipe is prohibitively expensive to manufacture in a length that would be useful for a full pipeline, and it cannot withstand significant compression or axial torsion without damage. Similarly, making an entire pipeline of TCP would also be very expensive.

Direct tie-in is proposed for a rigid pipeline in WO 2017/146582. which is the simplest and least expensive tie-in solution in principle. However, in practice, direct tie-in of a rigid pipeline risks failure arising from irrecoverable plastic deformation of the pipeline and requires additional measures to manage thermal expansion and contraction.

U.S. Pat. No. 9,121,529 proposes terminating a rigid subsea pipeline with additional sections of flexible pipe. The sections of flexible pipe are pliant enough to be connected to a surface facility as a riser or to a static structure on the seabed as a jumper.

In U.S. Pat. No. 9,121,529, the full length of the rigid pipeline is firstly laid on the seabed by a conventional technique such as S-lay, J-lay or reel-lay. Then, in a subsequent operation, an end of the pipeline is located and lifted to an installation vessel at the surface. There, the flexible pipe is coupled to the rigid pipeline, end-to-end, and the rigid pipeline is lowered back to the seabed suspended from an abandonment and recovery (A&R) wire of the installation vessel. Simultaneously, the appropriate length of flexible pipe is launched progressively from the vessel. The upper, free end of the flexible pipe may then be handed over for connection to a surface facility as a riser or may instead be abandoned to the seabed for subsea connection as appropriate.

The procedure described in U.S. Pat. No. 9,121,529 is useful for installing a section of flexible pipe that is long enough to be used as a riser. However, the procedure is inappropriately complex for installing a jumper pipe, which could be as short as 100 m or less. Also, the procedure may be impractical in deep water, where a substantial weight load of the rigid pipeline would have to be suspended from the A&R wire via a short length of the less robust flexible pipe.

In summary, the prior art has failed to provide an effective low-cost and simple to install solution to the challenge of maintaining internal corrosion protection substantially continuously along a multi-section flowline.

Against this background, the invention resides in a method of installing a subsea tie-in conduit. The method comprises: unspooling or manufacturing a rigid pipeline aboard an installation vessel; launching the pipeline progressively from the vessel into water; coupling a distal end of the tie-in conduit to a proximal end of the pipeline aboard the vessel, the tie-in conduit being pliant relative to the pipeline; and launching the tie-in conduit into the water coupled to the pipeline, while supporting a suspended weight load of the pipeline along a load path that substantially bypasses the tie-in conduit.

The tie-in conduit is launched fully into the water before landing the proximal end of the pipeline on the seabed. Thus, the tie-in conduit may have a length that is less than the depth of the water into which the tie-in conduit is launched.

The load path is suitably defined by an A&R wire that extends from the vessel and is coupled to the proximal end of the pipeline. For example, the A&R wire may conveniently be connected to a coupling at the proximal end of the pipeline, that coupling effecting fluid communication between the pipeline and the tie-in conduit. Substantially all of the suspended weight load of the pipeline may be borne by the A&R wire.

A proximal end of the tie-in conduit may be suspended from the A&R wire or from an auxiliary wire that extends from the vessel.

Advantageously, the pipeline and the tie-in conduit may be allowed to pivot together relative to the A&R wire about a substantially horizontal axis.

After being landed on the seabed, the tie-in conduit may be deflected relative to the pipeline. The deflected tie-in conduit may be connected to a subsea structure for fluid communication with the pipeline.

The tie-in conduit may be stored aboard the vessel, in a straight or curved configuration, before being coupled to the rigid pipeline.

The tie-in conduit preferably comprises a composite pipe but may comprise a flexible pipe. The invention has particular benefit where the rigid pipeline needs to be lined with a corrosion-resistant liner.

The inventive concept extends to subsea flowlines. One such flowline of the invention comprises: a rigid pipeline lined with a corrosion-resistant liner; a tie-in conduit of composite pipe that is more pliant than the pipeline; and a coupling that joins the pipeline and the tie-in conduit on a common longitudinal axis. The coupling includes a pivoting anchorage for an A&R wire, the anchorage being arranged to allow the pipeline and the tie-in conduit to pivot together relative to an anchored A&R wire.

Another such flowline of the invention comprises: a rigid pipeline lined with a corrosion-resistant liner; a corrosion-resistant tie-in conduit that is more pliant than the pipeline;

and a coupling that joins the pipeline and the tie-in conduit on a common longitudinal axis. The coupling includes a pivoting anchorage for an A&R wire, the anchorage comprising a rigid yoke bridle that straddles the tie-in conduit and that is arranged to allow the pipeline and the tie-in conduit to pivot together relative to an anchored A&R wire.

The yoke bridle may, for example, comprise pivotable legs joined by a transverse bridge that has an anchor formation for connection to the A&R wire.

The invention allows continuity of corrosion-resistant material in the bore of a flowline, with lined rigid pipe in series with composite pipe or unbonded flexible pipe for the same corrosion-proof function. TCP is preferred. Whilst stiffer than flexible pipe, TCP is significantly more pliant than steel rigid pipe with a similar bore diameter.

In summary, before final laydown of a rigid pipeline installation, a more pliant spool or jumper of TCP or unbonded flexible pipe is connected to the second end of the rigid pipeline. A yoked bridle is used to attach an A&R wire to allow deployment without the spool or jumper taking the full installation load or being subjected to significant bending moments as a result of the interface between the rigid and pliant pipes.

The second end of the pliant spool or jumper may conveniently be deployed using a second connection to the A&R wire, allowing the spool or jumper to hang under the A&R wire but not to be subjected to the abandonment loading of the A&R wire.

This invention allows the single deployment of a rigid pipeline and pliant tie-in conduit from an installation vessel to the seabed. The installation vessel can then disconnect the rigid pipeline and the tie-in conduit from the A&R wire and proceed to tie-in the jumper to the relevant subsea architecture.

TCP offers a corrosion resistant pipeline solution and the benefits of flexibility or pliancy, hence eliminating the need for metrology. However, as TCP is more expensive than polymer-lined rigid pipe, the invention employs a cost-effective hybrid of both. The invention also proposes a more cost-effective installation of this hybrid system, allowing a single-vessel, single-trip solution.

Embodiments of the invention provide a corrosion-resistant flowline, comprising: a main section of corrosion-resistant pipeline, for example polymer-lined pipeline; and at least one thermoplastic composite spool for fluidly linking the polymer-lined pipe to a connection point.

The polymer-lined pipeline may comprise at least a steel pipeline and an inner polymer liner. An end of the polymer liner is suitably sealed to ensure internal continuity with the thermoplastic pipe.

The inventive concept may also be embodied in a subsea installation comprising one or more flowlines of the invention.

Embodiments of the invention also implement a method to perform direct tie-in of a corrosion-resistant flowline to a subsea connection point. The method comprises the following steps: installing the corrosion-resistant flowline from its first end; before abandonment of the second end close to the subsea connection point, connecting a pliant spool to the second end; abandoning the second end on its target by holding it back by a tensioned abandonment cable; simultaneously lowering the free end of the spool; and after landing the second end, deforming the spool to connect it to the subsea connection point. The spool may be much shorter and lighter than the main flowline section, for example less than 100 m long The installation method may involve any pipelaying method, for example reel lay. Connections of the pliant spool may, for example, be effected by flanged connectors.

The connection between the lined pipe and the spool may comprise a yoke for connecting the tensioned abandonment line.

The free end of the spool may be lowered by a wire connected to the abandonment cable, for example via a shackle arrangement, a tri-plate or an equivalent rigging arrangement. Alternatively the free end of the spool may be lowered by a wire connected to a winch of the installation vessel.

Thus, the invention provides a method of installing a subsea tie-in conduit. The method comprises unspooling or manufacturing a steel rigid lined pipeline aboard an installation vessel and launching the pipeline progressively from the vessel into water. A distal end of the tie-in conduit is coupled to a proximal end of the pipeline above the surface and is then launched into the water coupled to the pipeline. The suspended weight load of the pipeline is supported by an A&R wire connected to the proximal end of the pipeline, defining a load path that bypasses the tie-in conduit. Elegantly, a proximal end of the tie-in conduit may be suspended from that wire.

The tie-in conduit is of composite or flexible pipe, hence being pliant relative to the lined rigid pipeline and maintaining internal corrosion resistance. After landing on the seabed, the tie-in conduit may be deflected relative to the pipeline for connection to a subsea connection point.

In order that the invention may be more readily understood, reference will now be made, by way of example, to the accompanying drawings in which:

FIG. 1 is a schematic side view of a pipelay vessel laying a rigid lined pipeline;

FIG. 2 corresponds to FIG. 1 but shows a tie-in conduit being coupled to a proximal end of the pipeline;

FIG. 3 corresponds to FIG. 2 but shows the pipeline and the tie-in conduit in the water beneath the vessel, suspended from an A&R wire;

Figure 4:
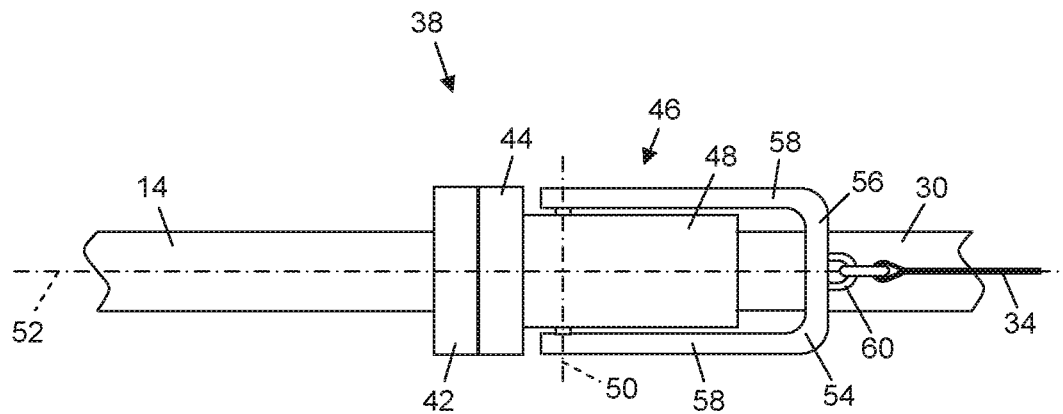
FIG. 4 is an enlarged schematic plan view of a coupling between the pipeline and the tie-in conduit.
Figure 5:
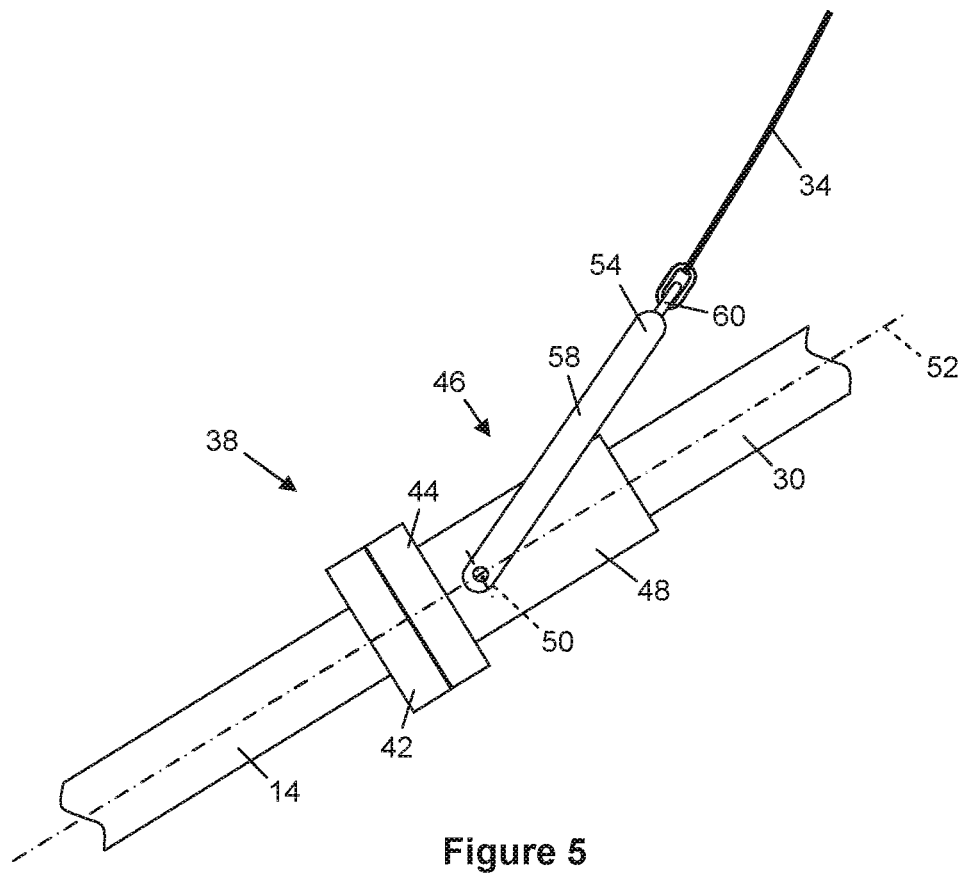
FIG. 5 is an enlarged schematic side view of the coupling of FIG. 4, oriented as in use.
Figure 7:
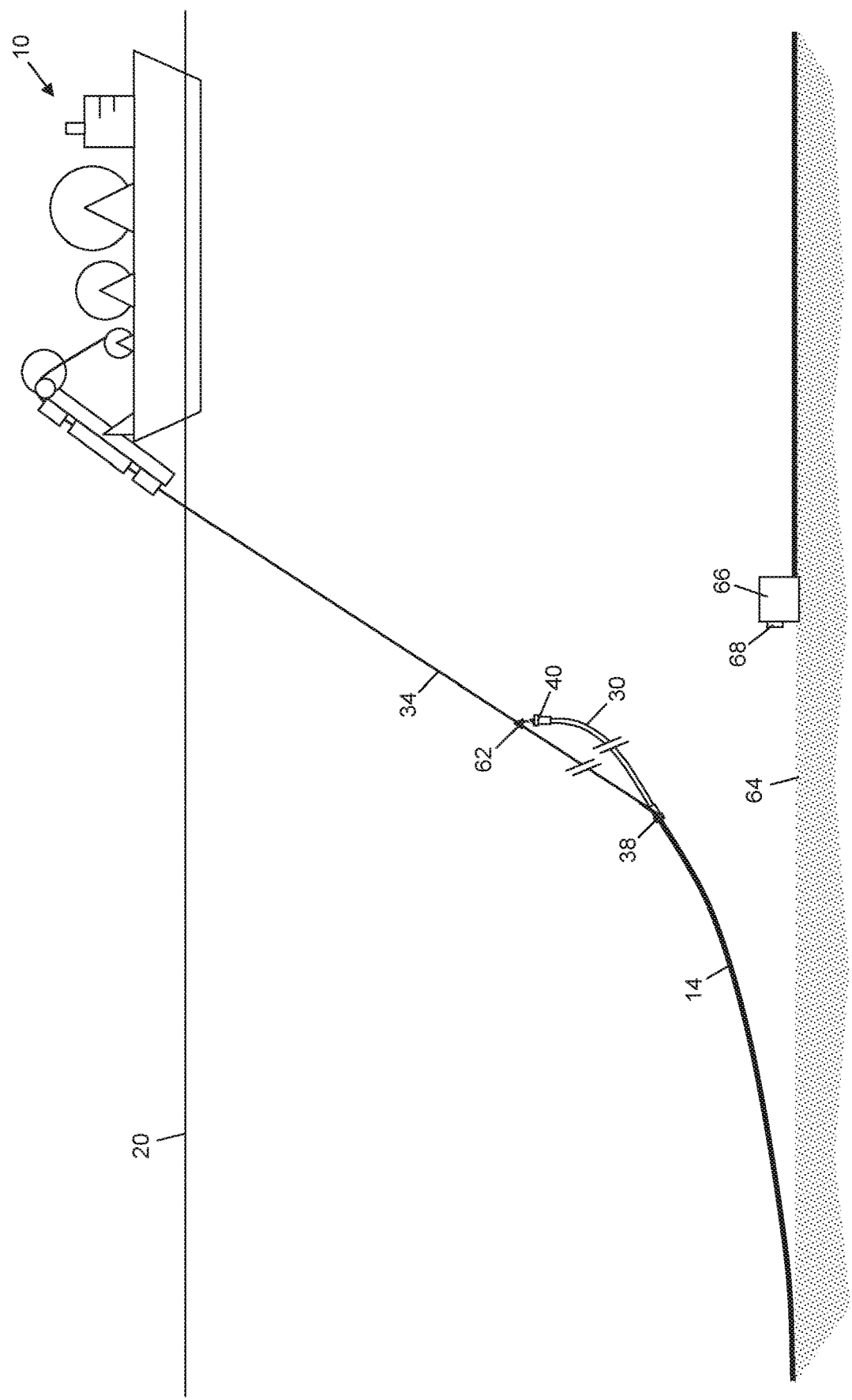
FIG. 7 is a schematic side view of the pipeline and the tie-in conduit being laid together on the seabed, with the tie-in conduit in the vicinity of a subsea structure that is to be connected to the pipeline.
Figure 8:
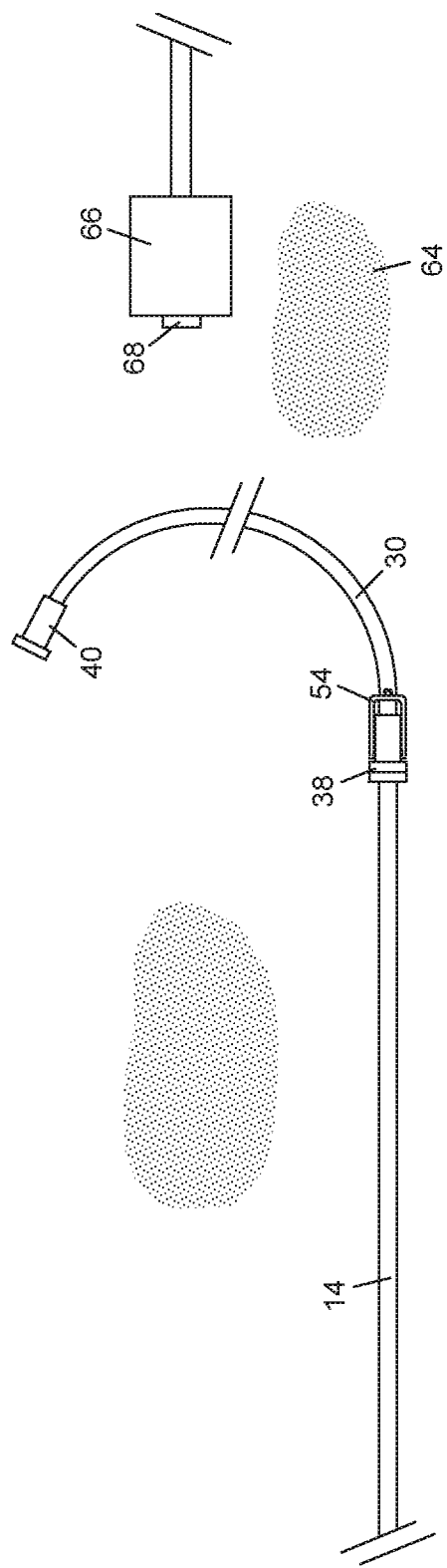
FIG. 8 is a schematic plan view of the pipeline and the tie-in conduit laid on the seabed, ready for connection to the subsea structure shown in FIG. 7.
Figure 9:
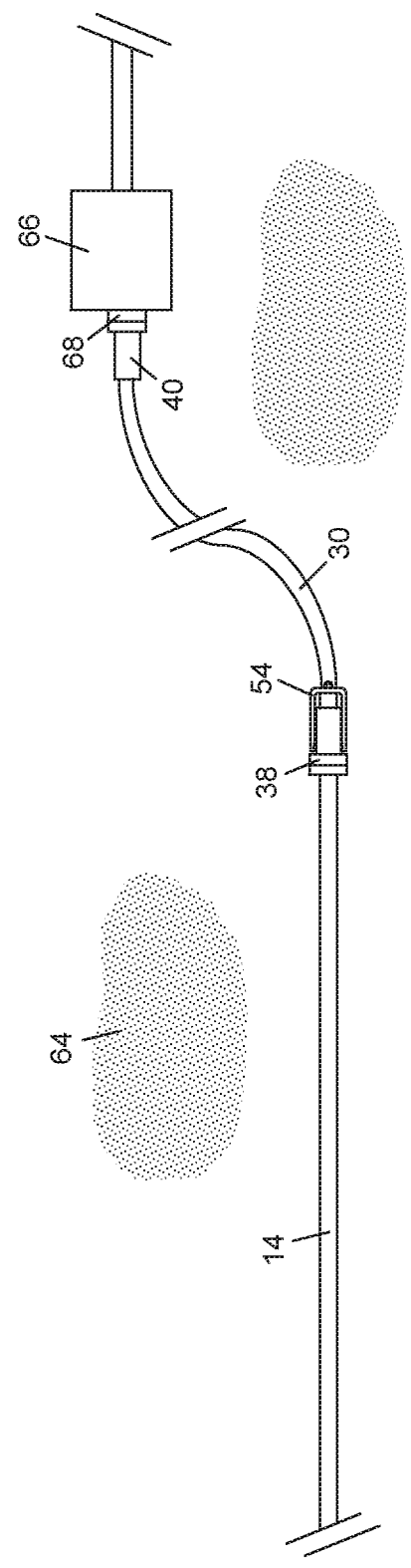
Figure 10:
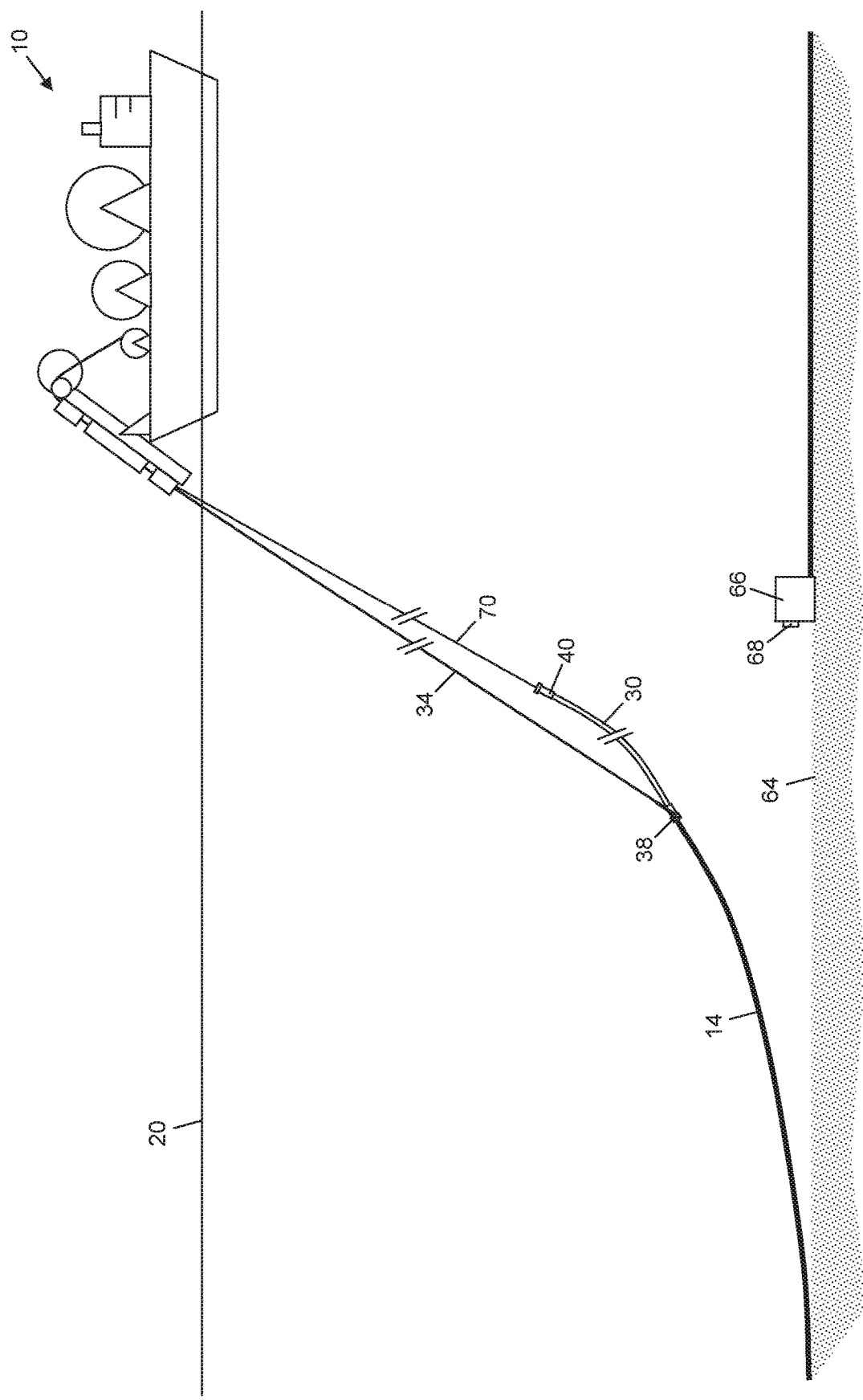
Figure 12:
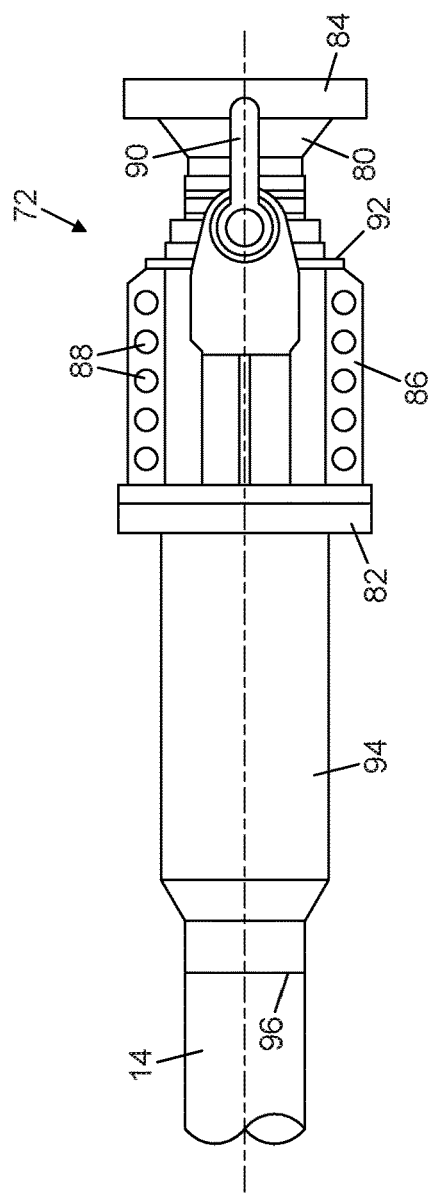
Figure 11:
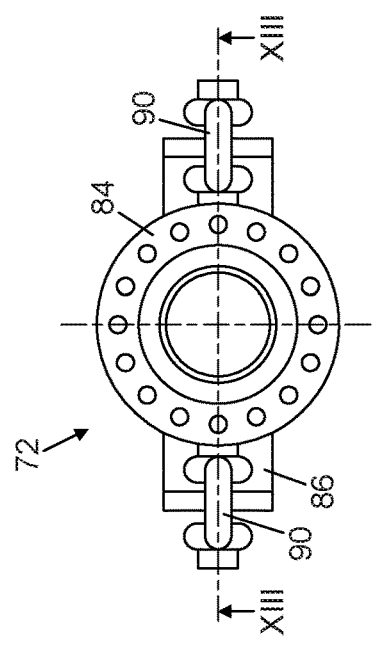

FIG. 9 corresponds to FIG. 8 and shows the tie-in conduit now connected to the subsea structure;

FIG. 10 corresponds to FIG. 7 but shows a variant in which the tie-in conduit is supported by an additional wire extending from the pipelay vessel;

FIG. 11 is an end view of an alternative to the coupling shown in FIGS. 4 and 5;

FIG. 12 is a side view of the alternative coupling shown in FIG. 11; and

Figure 13:
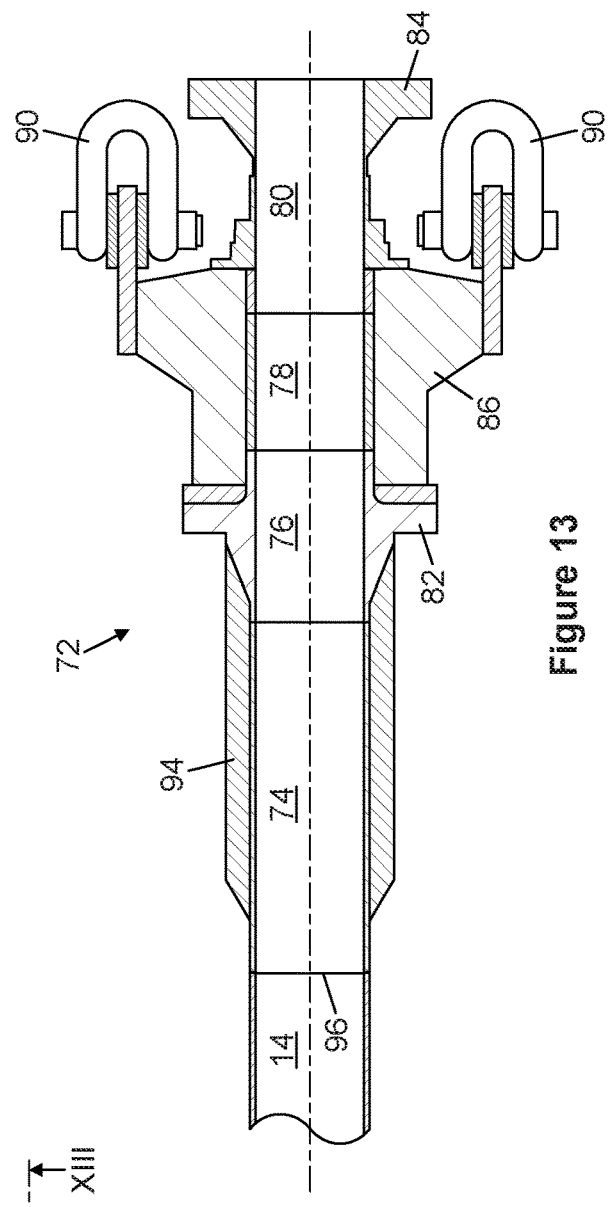

FIG. 13 is a longitudinal sectional view of the alternative coupling taken on line XIII-XIII of FIG. 11.

Figure 1:
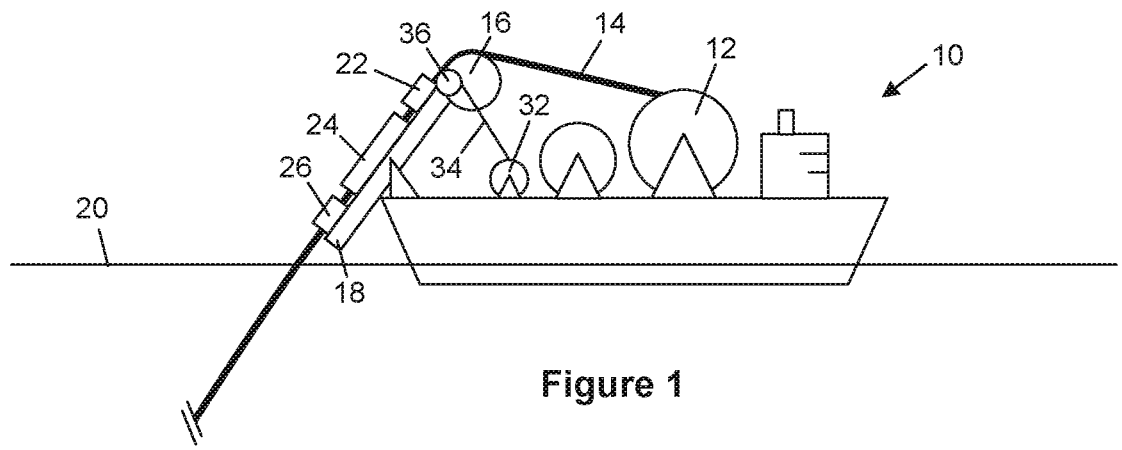
Figure 2:
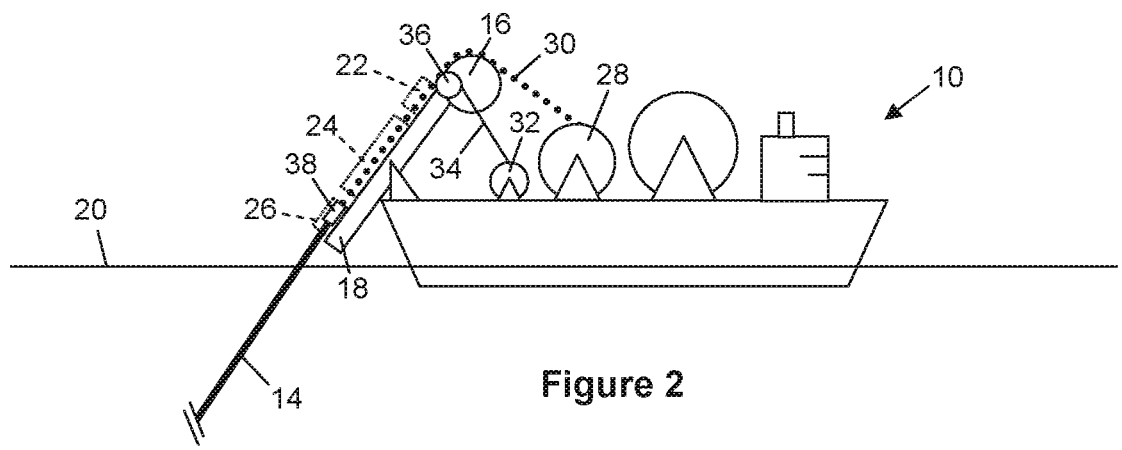
Figure 3:
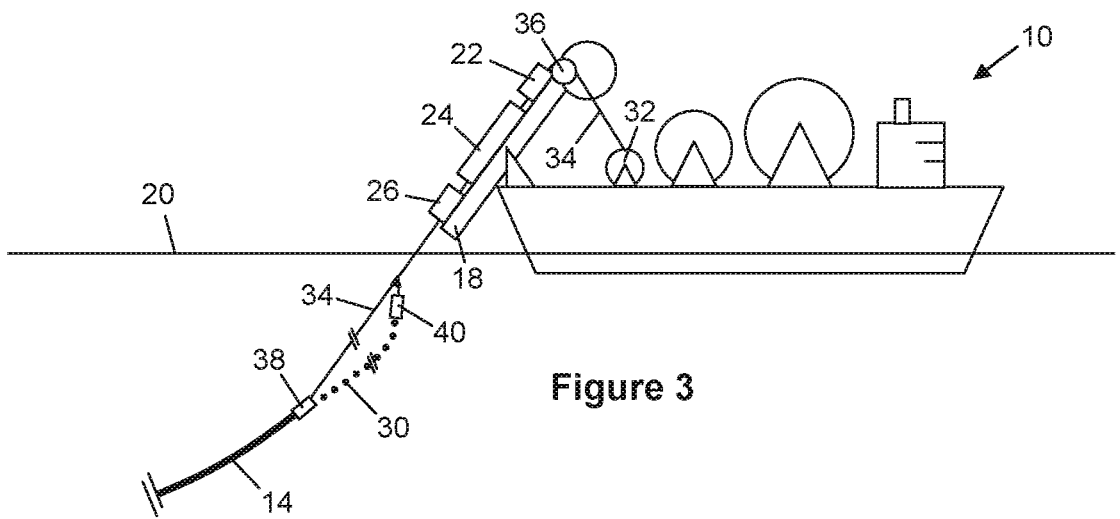

Referring firstly to FIGS. 1 to 3 of the drawings, a pipelay vessel 10 is exemplified here as being configured for reel-lay operations. The invention could, however, be applied to pipelay vessels 10 that are configured differently, most notably for S-lay or J-lay operations.

As is conventional, the vessel 10 comprises a main reel 12 that stores a length of rigid pipeline 14. The pipeline 14 is primarily of steel and is lined internally for corrosion resistance, for example with a polymer liner.

The main reel 12 turns to advance the pipeline 14 over a chute or guide wheel 16 at the top of an inclined laying ramp 18. The pipeline 14 is launched from the bottom of the ramp 18 to extend beneath the surface 20. The pipeline 14 is launched on a launch axis whose inclination corresponds to the inclination of the ramp 18.

The inclination of the ramp 18 may be adjusted to suit different operational circumstances. For example, the ramp 18 may be pivoted to a shallower incline for transit and for loading, or to a steeper incline for pipelaying in deeper water.

As is also conventional, the ramp 18 supports a straightener system 22, a tensioner system 24 and a hang-off or hold-back system 26. The straightener system 22 reverses plastic deformation of the pipeline 14 advanced from the main reel 12. The tensioner system 24 supports the suspended weight of the pipeline 14 as the pipeline 14 is being launched. The hold-back system 26 clamps or otherwise engages the pipeline 14 to allow connection of other equipment or conduits in fluid communication with the pipeline 14.

The vessel 10 shown in FIGS. 1 to 3 is also equipped with an auxiliary reel 28. In this example, the auxiliary reel 28 is used to store a discrete tie-in conduit 30 as represented schematically by a dotted line in FIGS. 2 and 3. The tie-in conduit 30 is of a determinate length that is substantially shorter than the pipeline 14 stored on the main reel 12. For example, the typical length of a discrete tie-in conduit 30 is in the range 20 m to 100 m, generally less than 50 m. The tie-in conduit 30 is also substantially more pliant than the pipeline 14, as will be explained.

FIGS. 1 to 3 also show that the vessel 10 is equipped with an A&R system comprising an A&R winch 32, from which an A&R wire 34 extends over a sheave 36 at the top of the ramp 18. The A&R system is capable of supporting the suspended weight of the pipeline 14 in the water column when the trailing or proximal end of the pipeline 14 has passed through the tensioner system 24 and has been released from the hold-back system 26.

FIG. 1 shows the pipeline 14 being unspooled from the main reel 12 over the guide wheel 16 at the top of the ramp 18. The pipeline 14 is then straightened by the straightener system 22 and launched into the sea with its suspended weight supported by the tensioner system 24. The hold-back system 26 is therefore disengaged to allow the pipeline 14 to pass through.

In FIG. 2, most of the pipeline 14 has been launched and the hold-back system 26 is now engaged to hold the proximal end of the pipeline 14. The tensioner system 24 is now disengaged to allow the pliant tie-in conduit 30 to be coupled to the proximal end of the pipeline 14. For this purpose, a coupling 38 is shown schematically between the tie-in conduit 30 and the pipeline 14. As will be explained with reference to FIGS. 4 and 5, the coupling 38 suitably comprises an end fitting of the tie-in conduit 30.

The tie-in conduit 30 will serve as a spool or jumper to effect subsea connection between the pipeline 14, after installation on the seabed, and another subsea structure to which the pipeline 14 is to be coupled for fluid communication.

In this example, the tie-in conduit 30 is a discrete length of TCP. This combines with the corrosion-resistant liner of the pipeline 14 to maintain internal corrosion resistance substantially continuously along the combined length of the pipeline 14 and the tie-in conduit 30.

The tie-in conduit 30 of TCP is pliant enough to enable easy tie-in to other subsea structures without requiring significant deflection of, and hence risking failure of, the stiffer rigid pipeline 14. Yet, the cost of the combination of the pipeline 14 and the much shorter tie-in conduit 30 is not much greater than the cost of an equivalent length of conventional lined rigid pipeline 14.

FIG. 2 shows the tie-in conduit 30 being advanced from the auxiliary reel 28 on which it is stored. It would also be possible for the tie-in conduit 30 to be stored elsewhere on the vessel 10, for example in a carousel or, if space permits, lying on a deck of the vessel 10. In principle, the tie-in conduit 30 could be spooled onto the main reel 12 in addition to the pipeline 14, for example beside the pipeline 14. The tie-in conduit 30 could even be stored off the vessel 10, for example towed or suspended behind, beside or under the vessel 10 or carried by a separate vessel 10. In any event, the tie-in conduit 30 may be stored in straight or curved configurations, the latter being more compact.

By virtue of the invention, the combination of the pipeline 14 and the tie-in conduit 30 is also quick and simple for one vessel 10 to install in a single pipelaying operation. In this respect, FIG. 3 shows the full length of the pipeline 14 now launched beneath the surface 20. The suspended weight of the pipeline 14 is borne by the A&R wire 34, which is connected to the coupling 38 at the proximal end of the pipeline 14 but could instead be connected directly to the pipeline 14 close to the proximal end.

The coupling 38 connects a leading or distal end of the tie-in conduit 30 to the proximal end of the pipeline 14. Conversely, an end fitting or connector hub 40 at the trailing or proximal end of the tie-in conduit 30 is connected to the A&R wire 34 at a location spaced proximally from the proximal end of the pipeline 14. Consequently, the tie-in conduit 30 hangs as a catenary between its distal and proximal ends, carrying no tensile loads other than those arising from its self-weight. Instead, the load path between the pipeline 14 and the vessel 10 extends substantially exclusively along the parallel A&R wire 34 that bypasses the tie-in conduit 30.

Turning next to FIGS. 4 and 5, these drawings show details of the coupling 38 between the pipeline 14 and the tie-in conduit 30. Coupling is effected between flanges in this example, specifically a flanged end 42 of the pipeline 14 and a correspondingly-flanged end fitting 44 of the tie-in conduit 30. The end fitting 44 may, for example, be a forging of steel containing a corrosion-resistant liner.

The end fitting 44 supports a yoke 46 that transfers the suspended weight load of the pipeline 14 to the A&R wire 34. The yoke 46 also allows the pipeline 14 and the tie-in conduit 30 to pivot relative to the A&R wire 34 during the installation process as shown in FIG. 5. This protects the pipeline 14 and the tie-in conduit 30 from excessive bending stresses while diverting the main load path away from the tie-in conduit 30.

The end fitting 44 has a tubular body 48 with diametrically-opposed spigots aligned on a transverse pivot axis 50. In this example, the pivot axis 50 intersects the central longitudinal axis 52 that extends through the end fitting 44 from the pipeline 14 to the tie-in conduit 30.

A U-shaped yoke bridle 54 straddles the body 48 of the end fitting 44. The yoke bridle 54 comprises a transverse bridge 56 that extends across the body 48 and parallel legs 58 joined by the bridge 56. The spigots on the pivot axis 50 are received within mutually-aligned through-holes near the free ends of the legs 58. This engagement defines a pivotable attachment between the yoke bridle 54 and the end fitting 44.

The bridge 56 that extends between the legs 58 of the yoke bridle 54 supports an anchor formation 60 for removably attaching the A&R wire 34 as shown.

The arched shape of the yoke bridle 54 provides clearance for pivotal movement of the coupling 38 and of the attached pipeline 14 and tie-in conduit 30. In particular, the arched shape avoids clashing of the yoke bridle 54 with the outer surface of the tie-in conduit 30.

Figure 6:
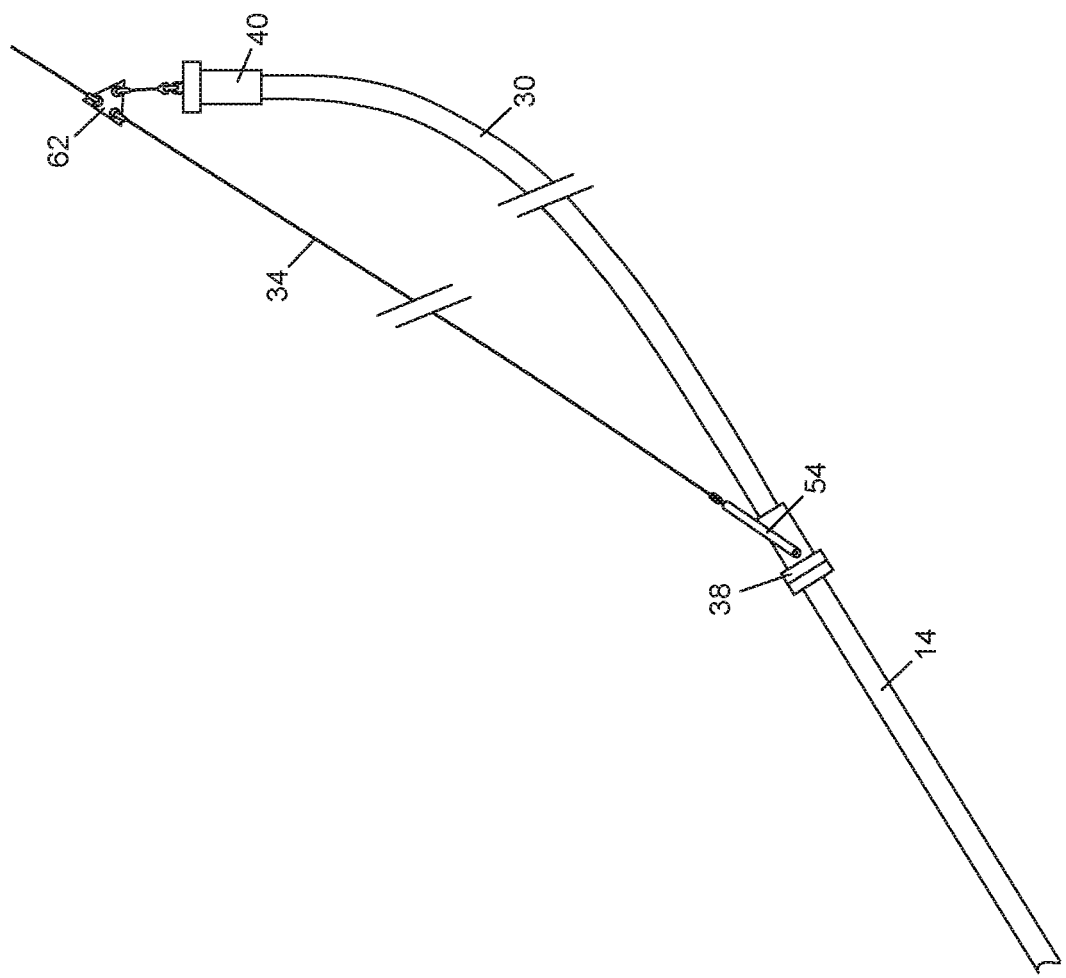
FIG. 6 is a schematic side view of the pipeline and the tie-in conduit suspended from the A&R wire and joined by the coupling shown in FIGS. 4 and 5.

FIG. 6 shows the tie-in conduit 30 extending between the coupling 38 of FIGS. 4 and 5 at its distal end and the flanged end fitting or connector hub 40 at its proximal end. The tie-in conduit 30 hangs beneath the A&R wire 34 in substantially the same vertical plane as the A&R wire 34.

The distal end portion of the tie-in conduit 30 adopts the same shallower inclination relative to the A&R wire 34 as the proximal end portion of the pipeline 14, which relative inclination is permitted by the pivotable yoke bridle 54 of the coupling 38. Conversely, the proximal end portion of the tie-in conduit 30 is inclined more vertically, at a steeper inclination than the A&R wire 34, hence converging upwardly toward the A&R wire 34 on an axis that, if projected, intersects the A&R wire 34. Indeed, the proximal end portion of the tie-in conduit 30 may be oriented vertically or near-vertically as shown here.

In this example, the end fitting or connector hub 40 is connected to the A&R wire 34 proximally with respect to the pipeline 14 via a tri-plate connector 62 incorporated into the A&R wire 34. Similar rigging arrangements are possible here instead, for example involving shackle connections.

FIG. 7 shows the pipeline 14 in the process of being laid down, curving distally from the coupling 38 to a touch-down point on the seabed 64. More of the pipeline 14 is laid down as the vessel 10 moves from left to right as illustrated and pays out the A&R wire 34. Eventually, the proximal end of the pipeline 14 is landed on the seabed 64, immediately followed by the tie-in conduit 30.

The pipeline 14 and the tie-in conduit 30 are landed on the seabed 64 on a heading that points generally toward a subsea structure 66 such as a manifold, to which the pipeline 14 is to be connected via the tie-in conduit 30. The structure 66 also has a flanged fitting or connector hub 68 that complements the flanged end fitting or connector hub 40 at the proximal end of the tie-in conduit 30.

Thus, the proximal end of the pipeline 14 is landed in the vicinity of the structure 66, close enough for the tie-in conduit 30 to bridge the distance between the pipeline 14 and the structure 66, while accommodating tolerances such as some misalignment between them. In this respect, FIGS. 8 and 9 show the scene from above. It will be apparent that the pipeline 14 is not fully aligned with the flanged fitting or connector hub 68 of the structure 66.

Initially, as shown in FIG. 8, the tie-in conduit 30 is deflected to be laid on the seabed 64 on a path that curves away from the pipeline 14. The A&R wire 34 is disconnected from the yoke bridle 54 of the coupling 38 and from the tie-in conduit 30, and then is recovered to the vessel 10.

Next, as shown in FIG. 9, the tie-in conduit 30 is connected to the structure 66, conveniently by the same vessel 10 during the same trip, using a crane or winch of the vessel 10 and supported by an ROV or divers. Specifically, the flanged end fitting or connector hub 40 at the proximal end of the tie-in conduit 30 is lifted into engagement with the complementary flanged fitting or connector hub 68 of the structure 66. The tie-in conduit 30 bends elastically, or at least without localised plastic deformation, to accommodate the misalignment between the pipeline 14 and the structure 66. The curvature of the tie-in conduit 30 also accommodates tolerances in the distance between the proximal end of the pipeline 14 and the structure 66.

Of course, it would instead be possible for the structure 66 to be installed on the seabed 64 after the pipeline 14 and the tie-in conduit 30 have been installed, and therefore for connection with the structure 66 to be made only then.

A step may alternatively consist in disconnecting only the yoke bridle 54 of the A&R wire 34, while the A&R wire 34 remains connected to the flanged end fitting or connector hub 40 of the tie-in conduit 30. The A&R wire 34 may thereby be used for guiding the flanged end fitting or connector hub 40 into position for coupling with the flanged fitting or connector hub 68 of the structure 66.

Many other variations are possible within the inventive concept. For example, FIG. 10 shows a variant of the invention in which the proximal end of the tie-in conduit 30 is supported by an auxiliary winch wire 70 extending from the vessel 10, rather than being hung from the A&R wire 34 as in the preceding embodiment. The auxiliary winch wire 70 could extend from the A&R winch 32 or from another winch of the vessel 10.

Finally, FIGS. 11 to 13 of the drawings show an alternative to the coupling shown in the preceding embodiment. The coupling 72 shown here comprises a main body made up from a tubular pup piece 74, a first forging 76, another short length of pipe 78 and a second forging 80, all of which are welded together. Alternatively, the forgings 76, 80 and the pipe 78 between them could be replaced by a unitary forging, welded to the pup piece 74. The pup piece 74 is generally made from the same pipe material as the rigid pipeline 14.

The first forging 76 includes an annular lip 82, which serves to support a catenary of the rigid pipeline 14 in conjunction with the hold-back system 26 on the vessel 10. The second forging 80 includes an end flange 84, which is suitable for connecting to a similarly-flanged end fitting of the tie-in conduit 30.

A collar 86 comprises two halves connected together by bolts 88. The collar 86 surrounds the pipe 78 and carries shackles 90 for the attachment of lifting rigging. The collar 86 is axially constrained by the annular lip 82 on the first forging 76 and by an annular lip 92 on the second forging 80 to transmit the load applied to the shackles 90 to the coupling 72 and the rigid pipeline 14.

Lifting rigging connected to the shackles 90 is connected to an A&R wire like that shown in the preceding embodiments. Pivoting of the shackles 90 relative to the collar 86 allows the coupling 72 to pivot relative to the A&R wire in the manner of the yoke bridle 54 of the preceding embodiments.

The main body of the coupling 72, comprising the pup piece 74, the first forging 76, the pipe 78, the second forging 80 and the shackles 90, is pre-assembled. The coupling 72 is then connected to the proximal end of the rigid pipeline 14 by welding. This connection is made on the vessel 10 after the rigid pipeline 14 has mostly been laid on the seabed 64, before laying down the final portion of the rigid pipeline 14 on the seabed 64, using an A&R winch connected to the shackles 90.

A thermal insulation coating 94 covers the outside of most of the pup piece 74 and of part of the first forging 76. The rigid pipeline 14 typically has a similar external insulating coating, although this has been cut back to allow welding and so is not shown in these drawings. Once a weld 96 has been made to join the coupling 72 to the rigid pipeline 14, the bare pipe around the weld 96 may be provided with a similarly-insulating field joint coating (not shown) to avoid cold spots along the length of the flowline.

The invention claimed is:

1. A method of installing a subsea tie in conduit, the method comprising:
   unspooling or manufacturing a rigid pipeline aboard an installation vessel;
   launching the pipeline progressively from the vessel into water;
   coupling a distal end of the tie in conduit to a proximal end of the pipeline aboard the vessel, the tie in conduit being pliant relative to the pipeline; and
   before landing the proximal end of the pipeline on the seabed, launching the tie in conduit fully into the water coupled to the pipeline, while supporting a suspended weight load of the pipeline along a load path that substantially bypasses the tie in conduit.

2. The method of claim 1, wherein the tie in conduit has a length that is less than the depth of the water into which the tie in conduit is launched.

3. The method of claim 1, wherein the load path is defined by an A&R wire that extends from the vessel and is coupled to the proximal end of the pipeline.

4. The method of claim 3, wherein the A&R wire is connected to a coupling at the proximal end of the pipeline, that coupling effecting fluid communication between the pipeline and the tie in conduit.

5. The method of claim 3, comprising carrying substantially all of the suspended weight load of the pipeline through the A&R wire.

6. The method of claim 3, comprising suspending a proximal end of the tie in conduit from the A&R wire.

7. The method of claim 3, comprising suspending a proximal end of the tie in conduit from an auxiliary wire that extends from the vessel.

8. The method of claim 3, comprising allowing the pipeline and the tie in conduit to pivot together relative to the A&R wire about a substantially horizontal axis.

9. The method of claim 1, further comprising:
   landing the tie in conduit on the seabed;
   deflecting the tie in conduit relative to the pipeline; and
   connecting the deflected tie in conduit to a subsea structure for fluid communication with the pipeline.

10. The method of claim 1, comprising storing the tie in conduit aboard the vessel before coupling the tie in conduit to the rigid pipeline.

11. The method of claim 10, comprising storing the tie in conduit in a curved configuration aboard the vessel.

12. The method of claim 1, wherein the tie in conduit comprises a composite pipe.

13. The method of claim 1, wherein the tie in conduit comprises a flexible pipe.

14. The method of claim 1, wherein the rigid pipeline is lined with a corrosion resistant liner.

15. A subsea flowline, comprising:
   a rigid pipeline lined with a corrosion resistant liner;
   a tie in conduit of composite pipe of polymer composite material that is more pliant than the pipeline; and
   a coupling that joins the pipeline and the tie in conduit on a common longitudinal axis and includes a pivoting anchorage for an A&R wire, the anchorage being arranged to allow the pipeline and the tie in conduit to pivot together relative to an anchored A&R wire.

16. The flowline of claim 15, wherein the coupling comprises an end fitting of the tie in conduit.

17. The flowline of claim 16, wherein the pivoting anchorage is attached to the end fitting.

18. The flowline of claim 15, wherein the pivoting anchorage comprises a rigid yoke bridle that straddles the tie in conduit.

19. The flowline of claim 18, wherein the yoke bridle comprises pivotable legs joined by a transverse bridge that has an anchor formation for connection to the A&R wire.

20. A subsea installation comprising at least one subsea flowline of claim 15.

21. A subsea flowline, comprising:
   a rigid pipeline lined with a corrosion resistant liner;
   a corrosion resistant tie in conduit of polymer composite material that is more pliant than the pipeline; and
   a coupling that joins the pipeline and the tie in conduit on a common longitudinal axis and includes a pivoting anchorage for an A&R wire, the anchorage comprising a rigid yoke bridle that straddles the tie in conduit and that is arranged to allow the pipeline and the tie in conduit to pivot together relative to an anchored A&R wire.

22. The flowline of claim 21, wherein the coupling comprises an end fitting of the tie in conduit.

23. The flowline of claim 22, wherein the yoke bridle is attached to the end fitting.

24. The flowline of claim 21, wherein the yoke bridle comprises pivotable legs joined by a transverse bridge that has an anchor formation for connection to the A&R wire.

25. The flowline of claim 21, wherein the tie in conduit comprises a composite pipe.

26. The flowline of claim 21, wherein the tie in conduit comprises a flexible pipe.

27. A subsea installation comprising at least one subsea flowline of claim 21.

* * * * *